US010083174B2

(12) United States Patent
Bareket et al.

(10) Patent No.: US 10,083,174 B2
(45) Date of Patent: Sep. 25, 2018

(54) CONTEXT ENRICHED APPLICATION TEXT TRANSLATION

(71) Applicant: INTERNATIONAL BUSINESS MACHINES CORPORATION, Armonk, NY (US)

(72) Inventors: Amit Bareket, Yavne (IL); Nadav Parag, Rehovot (IL); Dan Ravid, Givatayim (IL); Tamir Riechberg, Hod HaSharon (IL); Moshe Weiss, Petah Tikva (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/791,541

(22) Filed: Oct. 24, 2017

(65) Prior Publication Data
US 2018/0046616 A1    Feb. 15, 2018

Related U.S. Application Data

(63) Continuation of application No. 14/181,702, filed on Feb. 16, 2014.

(51) Int. Cl.
G06F 17/28    (2006.01)
(52) U.S. Cl.
CPC .................. G06F 17/289 (2013.01)
(58) Field of Classification Search
CPC .................................................. G06F 17/289
See application file for complete search history.

(56) References Cited

U.S. PATENT DOCUMENTS

| 7,509,251 | B2 | 3/2009 | Andrews et al. |
|---|---|---|---|
| 8,364,464 | B2 | 1/2013 | Elgazzar et al. |
| 2006/0059424 | A1 | 3/2006 | Petri et al. |
| 2006/0287844 | A1 | 12/2006 | Rich |
| 2007/0244691 | A1 | 10/2007 | Alwan et al. |
| 2010/0030549 | A1 | 2/2010 | Lee et al. |
| 2011/0301958 | A1 | 12/2011 | Brush et al. |
| 2012/0215521 | A1 | 8/2012 | Sistrunk |
| 2012/0245922 | A1 | 9/2012 | Kozlova et al. |
| 2013/0067360 | A1 | 3/2013 | Salva et al. |
| 2013/0073955 | A1 | 3/2013 | Fitzpatrick et al. |
| 2014/0081620 | A1 | 3/2014 | Solntseva |
| 2015/0134323 | A1 | 5/2015 | Cuthbert et al. |

OTHER PUBLICATIONS

List of IBM Patents or Patent Applications Treated as Related, dated herewith.

*Primary Examiner* — Tammy Paige Goddard
*Assistant Examiner* — Keara Harris
(74) *Attorney, Agent, or Firm* — ZIP Group PLLC

(57) ABSTRACT

A multilayered context enriched text translation interface includes a simulation layer comprising one or more text objects and a translation layer. The interface displays one or more mimicked views of an application GUI in the simulation layer. Subsequent to a user engaging a text object, the interface displays a prompt for a text translation of the text object within a translation layer. In certain embodiments, the mimicked views are graphical reproductions of the application GUI pages with functionality of one or more text objects of the application GUI disabled. In certain embodiments, the prompt includes an accentuation objects to visually accentuate the text object, a text-editing object to receive the text translation of the text object, and a link object to visually connect the accentuation objects and text-editing object.

11 Claims, 8 Drawing Sheets

CONTEXT ENRICHED APPLICATION TEXT TRANSLATION

FIELD OF THE INVENTION

Embodiments of present invention generally relate to the field of software applications and, more specifically, relate to a system to allow for context enriched application translation.

DESCRIPTION OF THE RELATED ART

A graphical user interface (GUI) is an interface that allows users to interact with electronic devices. The use of GUIs is widespread. For example, GUIs are used in computers, tablet computers, mobile phones, portable media players, gaming devices, household appliances, cash machines, and office equipment to display various software applications. Software applications may include images and text that may be displayed via GUIs.

Translation of software application text to multiple languages is done today with the use of property files maintained by the application programmer while developing new code. For example, the application programmer may create an application named AutoClaims in English that is intended to be translated into Simplified Chinese and French. First, the programmer creates an English resource file within the property files, named, e.g. AutoClaims_en_US.properties. Next, the AutoClaims_en_US.properties file is accessed by a translation team whom translates the file into Simplified Chinese and French, renames each translated file to Auto-Claims_zh_CN.properties and AutoClaims_fr.properties, and adds the translated files to the property files. The translation team translates the original text resource file directly from the property files without visualizing the application view(s), without viewing or knowledge of text location(s), without context or knowledge of the relationships between different text strings within a particular view, etc.

SUMMARY

In an embodiment of the present invention, a computer system is presented. The computer system includes a touch screen and a processor communicatively connected to a memory. The memory includes program instructions that when executed by the processor, cause the computer system to display a mimicked view of an application graphical user interface (GUI) upon the touch screen in a simulation layer of a multilayered translation interface. The mimicked view is a graphical reproduction of the application GUI with functionality of the one or more text objects of the application GUI disabled. The simulation layer comprises one or more text objects. The program instructions further cause the computer system to, subsequent to a user touch engaging a text object within the simulation layer, display a prompt for a user to enter a text translation of the touch engaged text object within a translation layer of the multilayered translation interface. The prompt further comprises an accentuation object within the translation layer to visually accentuate the engaged text object, a text-editing object within the translation layer to receive the text translation of the engaged text objet from the user via the touch screen, and a link object within the translation layer that visually connects the accentuation object and the text-editing object. The program instructions further cause the computer system to receive the text translation of the touch engaged text object and display the text translation within the mimicked view in the simulation layer in place of the engaged text object.

In an embodiment of the present invention, a computer system is presented. The computer system includes a display screen and a processor communicatively connected to a memory. The memory includes program instructions that when executed by the processor, cause the computer system to display a mimicked view of an application graphical user interface (GUI) upon the display screen in a simulation layer of a multilayered translation interface. The mimicked view is a graphical reproduction of the application GUI with functionality of the one or more text objects of the application GUI disabled. The simulation layer comprises one or more text objects. The program instructions further cause the computer system to, subsequent to a user engaging a text object within the simulation layer, display a prompt for a user to enter a text translation of the engaged text object within a translation layer of the multilayered translation interface. The prompt further comprises an accentuation object within the translation layer to visually accentuate the engaged text object, a text-editing object within the translation layer to receive the text translation of the engaged text objet from the user via a keyboard, and a link object within the translation layer that visually connects the accentuation object and the text-editing object. The program instructions further cause the computer system to receive the text translation of the engaged text object and display the text translation within the mimicked view in the simulation layer in place of the engaged text object.

In yet another embodiment of the present invention, a computer system includes a screen and a processor communicatively connected to a memory. The memory includes program instructions that when executed by the processor, cause the computer system to display an application graphical user interface (GUI) upon the screen. The application GUI includes a simulation layer and a translation layer. The simulation layer displays one or more mimicked views of the application GUI. The mimicked views are graphical reproductions of the application GUI pages with functionality of one or more text objects of the application GUI disabled. The translation layer displays a prompt for a text translation of the one or more text objects displayed within the simulation layer, subsequent to a user engaging the one or more text objects. The prompt includes one or more accentuation objects to visually accentuate the engaged one or more text objects, one or more text-editing objects to receive the text translation of the engaged one or more text objects via a keyboard of the computer system, and one or more link objects to visually connect one or more accentuation objects with respective one or more text-editing objects. Upon the receipt of the text translation of the engaged one or more text objects, the application GUI further comprises the text translation within the mimicked view in the simulation layer in place of the engaged one or more text objects.

These and other embodiments, features, aspects, and advantages will become better understood with reference to the following description, appended claims, and accompanying drawings.

DETAILED DESCRIPTION

Figure 1:
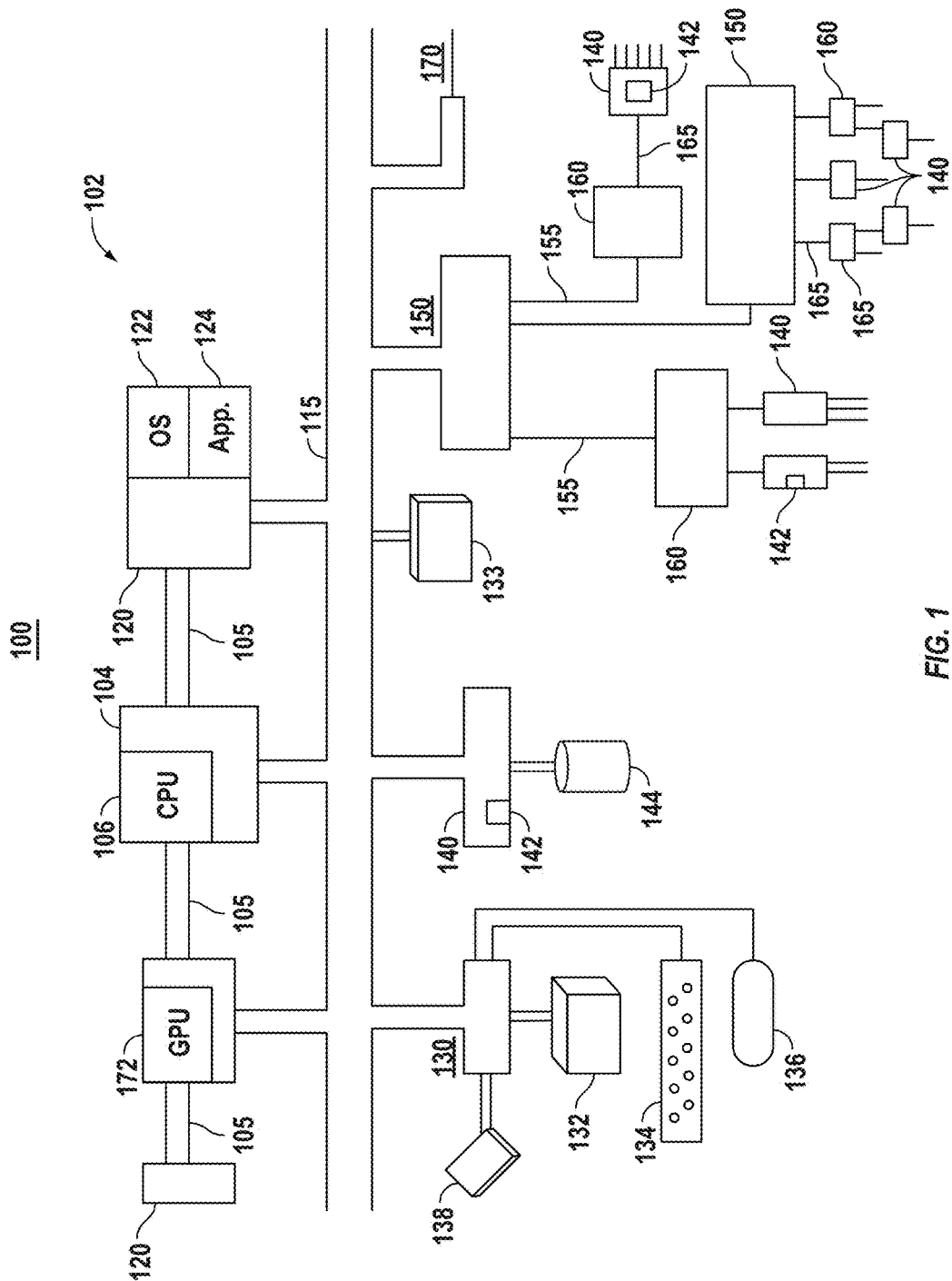
FIG. 1 illustrates components and an interconnection topology for an information handling system that may utilize or enable one or more embodiments the present invention.

FIG. 1 illustrates components and an interconnection topology for an information handling system, for example a computer system 100 that may utilize or enable one or more embodiments the present invention. Computer system 100 may comprise a host 102 having a host processor complex 104 connected to a memory 120 by an internal bus 105 and/or a host system bus 115. In certain embodiments, host 102 may also include a graphics processor complex 170 connected to memory 120 by the internal bus 105 and/or the host system bus 115. In various embodiments, graphics processor complex 170 may be included in or may be distinct from host processor complex 104.

The host processor complex 104 has at least one general-purpose programmable processor unit (CPU) 106 that may execute program instructions stored in main memory 120. Although a single CPU 106 is shown in FIG. 1, it should be understood that a processor complex 104 may have multiple CPUs 106. Host processor complex 104 also has at least one general-purpose programmable graphics processor unit (GPU) 172 that builds images for output to a display 132. CPU 106 working in conjunction with applications 124 sends information about an image to GPU 172. GPU 172 determines how to manipulate pixels on e.g. display 132 or touch screen 133 to create the image or user interface. Ultimately, GPU 172 communicates that information to external display 132 or touch screen 133 and the image or interface is displayed to a user. CPU 106 and GPU 172 may be discrete components as shown in FIG. 1 or may be integrated into a single component.

Memory 120 or a portion of memory 120 may be included within the host processor complex 104 and/or graphics processor complex 170 or connected to it via an internal bus system 105 or via a host system bus 115. Memory 120 may be for example a random access memory for storing data and/or program instructions. Though memory 120 is shown conceptually as a single monolithic entity, memory 120 may be arranged as a hierarchy of caches and other memory devices. In some instances, a hierarchy of cache memories is associated with each CPU 106 and/or GPU 172. Memory 120 may include an operating system (OS) 122 and applications 124. Operating system 122 may provide functions such as device drivers or interfaces, management of memory pages, management of multiple tasks, etc., as is known in the art. Applications 124 may be programs, procedures, algorithms, routines, instructions, software, etc. that directs what tasks computer system 100 should accomplish and instructs how computer system 100 should accomplish those tasks. Applications 124 may for example include a server software application whereby a network interface 170 may interact with the server software application to enable computer system 100 to be a network server. Applications 124 may alternatively for example include a text translation application whereby a network interface 170 may interact with the text translation application to enable computer system 100 to be a remote text translation device.

Host system bus 115 may support the transfer of data, commands, and other information between the host processor system 102 and other internal, peripheral, or external devices attached to it. Host system bus 115 may also support the communication of data between external devices independent of the host processor complex 102. While shown in simplified form as a single bus, the host system bus 115 may be structured as multiple buses which may be for example hierarchically arranged. Host system bus 115 may be connected to other internal host 102 components (such as a touch screen display 133, display 132, etc.) and/or to a myriad of external or peripheral devices through a connection hub 130, through an adapter 140, a multifunction adapter 150, or directly to a network 170.

In various embodiments discussed herein, a user is able to control computer system 100 by making manipulations via a GUI. Therefore, in various embodiments generally, computer system 100 includes a user manipulation receiver to receive such manipulations. For example, in various embodiments a user manipulation receiver may be touch screen display 133, keyboard 134, a mouse or other handheld device 136, etc.

In exemplary embodiments, the computer system 100 may be a mobile device that comprises one or more input devices, display 132, one or more capture devices, memory 120, etc. Input device(s) may be any system and/or device capable of receiving input from a user. Examples of input devices include, but are not limited to, a mouse, a key board, a microphone, a touch screen 133, and the like input devices. In the various embodiments, each input device is in communication with display 132. Display 132 may be any system and/or device capable of displaying data. In one embodiment, display 132 includes touch screen 133 such that display 132 and the input device are integrated devices. In various embodiments, display 132 is configured to display data received from input device(s) and one or more capture devices. Capture device(s) may be any system and/or device capable of capturing environmental inputs (e.g., visual inputs, audio inputs, and tactile inputs). Examples of capture devices include, but are not limited to, a camera, a microphone, a global positioning system (GPS), a gyroscope, a plurality of accelerometers, and the like capture devices.

Various devices may be included within computer system 100 and/or connected to computer system 100. These devices may include a monitor or display 132, a keyboard 134, a mouse or other handheld device 136, and/or a printer 138. Display 132 may be a cathode-ray tube display, a flat panel display, or other display technology. One or more adapters 140 may support keyboard 134 and mouse 136; it being understood that other forms of input devices could be used. The number and types of devices shown in FIG. 1 are illustrative only and ordinary users of computer systems now know that a great variety of connected devices exist; e.g., microphones, speakers, infrared remote controls, wireless connected devices, etc. and therefore computer system 100 is not limited to those devices illustrated in FIG. 1.

The host system bus 115 may also be connected to an adapter 140. Adapter 140 is an expansion device that may expand the functionalities of computer system 100. For example, adapter 140 may be an input output (I/O) adapter connected to an external memory device 144, a graphics adapter including graphics processing complex 170 that is connected to an external display 132, etc. External memory device 144 may be rotating magnetic disk storage, rotating or static optical drives, magnetic tape storage, FLASH memory, etc. Adapter 140 may include adapter microcode or firmware and decision logic which may be embodied as a message processor 142. The adapter 140 may also be provided with at least one fast nonvolatile write cache, queues, interrupt registers connected to the message processor 142 and/or decision logic. The message processor 142 may process incoming messages from the host processor complex 102 and generate and transmit response messages back to the host processor complex 102.

An adapter 140 may contain electronic components and logic to adapt or convert data of one protocol on one bus to another protocol on another bus. Therefore, adapters 140 may connect a wide variety of devices to the host computer system 102 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

The host system bus 115 may also be connected to a multifunction adapter 150 to which more I/O devices may be connected either directly, or through one or more bridge devices 160, or through another multifunction adapter 150 on either a primary bus 155 or a secondary bus 165. Various components may be connected to the primary bus 155 including, for example, an adapter 140, a bridge device 160, or another multifunction I/O processor or a multifunction adapter 150. The bridge device 160 bridges the primary bus 155 and a secondary bus 165 to which various adapters 140 may be connected. The adapters 140, the primary bus 155, and the secondary bus 165 may conform to the PCI/PCI-X or other industry bus specification. One skilled in the art realizes, however, that the implementation is not limited to a PCI/PCI-X or a SCSI or USB bus implementation but is applicable to any electrical, optical, or wireless bus where data must be efficiently transferred.

Network interface 170 provides an operative connection for transmission of data to and from a network. The network may be an internet but could also be any smaller self-contained network such as an intranet, a WAN, a LAN, or other internal or external network using; e.g., telephone transmission lines, cable services, satellites, fiber optics, Ti lines, wireless, etc., and any other various technologies.

Computer system 100 need not be a computer at all, but may be a simpler device such as a network terminal, a thin client, a terminal-like device, a voice response unit, etc. The convergence of computing, telecommunications and consumer electronics is causing a tremendous growth in the number and variety of pervasive mobile devices as clients. This mobile architecture enables the multitude of client devices including laptops, sub-notebooks, handheld computers such as personal digital assistants and companion devices, and mobile appliances such as smart phones, pagers, simple messaging devices and wearable devices. In exemplary embodiments, the computer system 100 may be a mobile device that comprises one or more input devices, display 132, one or more capture devices, memory 120, etc. Input device(s) may be any system and/or device capable of receiving input from a user. Examples of input devices include, but are not limited to, a mouse, a key board, a microphone, a touch screen 133, and the like input devices. In the various embodiments, each input device is in communication with display 132. Display 132 may be any system and/or device capable of displaying data. In one embodiment, display 132 includes touch screen 133 such that display 132 and the input device are integrated devices. In various embodiments, display 132 is configured to display data received from input device(s) and one or more capture devices. Capture device(s) may be any system and/or device capable of capturing environmental inputs (e.g., visual inputs, audio inputs, and tactile inputs). Examples of capture devices include, but are not limited to, a camera, a microphone, a global positioning system (GPS), a gyroscope, a plurality of accelerometers, and the like capture devices. Thus when the computer system 100 is a mobile device, adapters 140 and network interfaces 170 may support a variety of multi-modal interfaces including traditional keyboard and mouse interfaces, small text screens, pen, touch screens, speech recognition, text-to-speech, and/or wearable devices.

In certain embodiments some or all of the devices shown and described in FIG. 1 may be included in a discrete computer system 100 (e.g. touch screen display 133, memory device 144, etc. are included within computer system 100, etc.). In other embodiments some of the devices shown and described in FIG. 1 may be separate, peripheral, or external to computer system 100 (e.g. multiple modular computer systems 100 may share a single large database, external display 132 is peripherally connected to computer system 100, etc.). Further, the devices shown and described in FIG. 1 may each include hardware and/or software device drivers, interfaces, registers, buffers, or the like to allow for effective communication between devices.

The computer system shown in FIG. 1 is intended to be a simplified representation, it being understood that many variations in system configuration are possible in addition to those specifically mentioned here. For instance, though computer system 100 may be a portable device as described above, computer system 100 may also be a larger computer system such as a general purpose server.

Various embodiments of the present invention pertain to methods that may be implemented upon or by computer system 100. When computer system 100 performs particular tasks according to one or more methods described herein as is directed by at least one application 124, such computer system 100 becomes a special purpose computer particular to those one or more methods.

Figure 2:
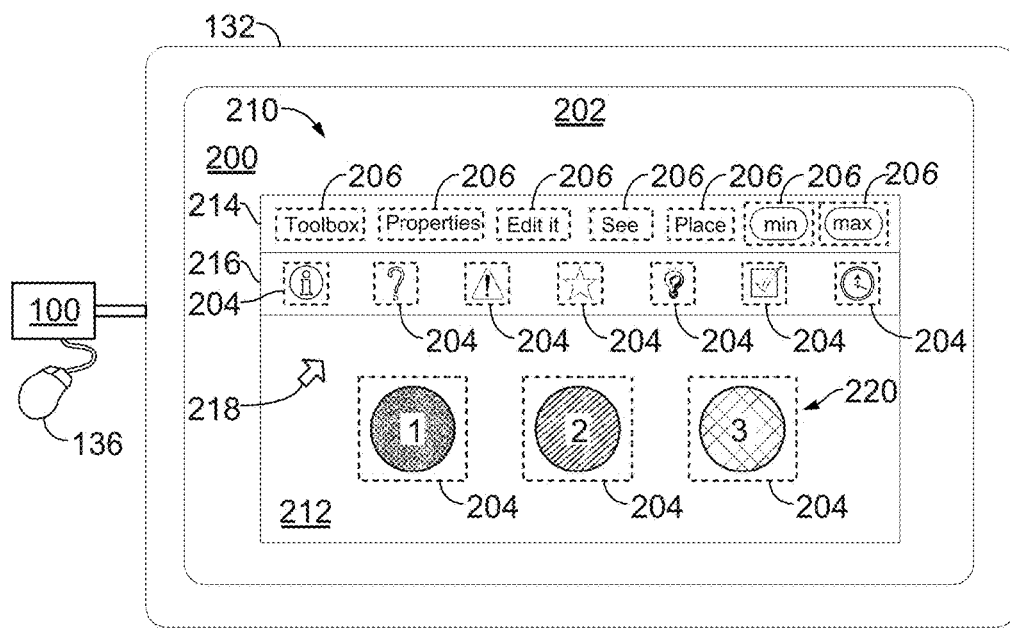
FIG. 2 and FIG. 3 illustrate exemplary GUI types according to embodiments of the present invention.
Figure 3:
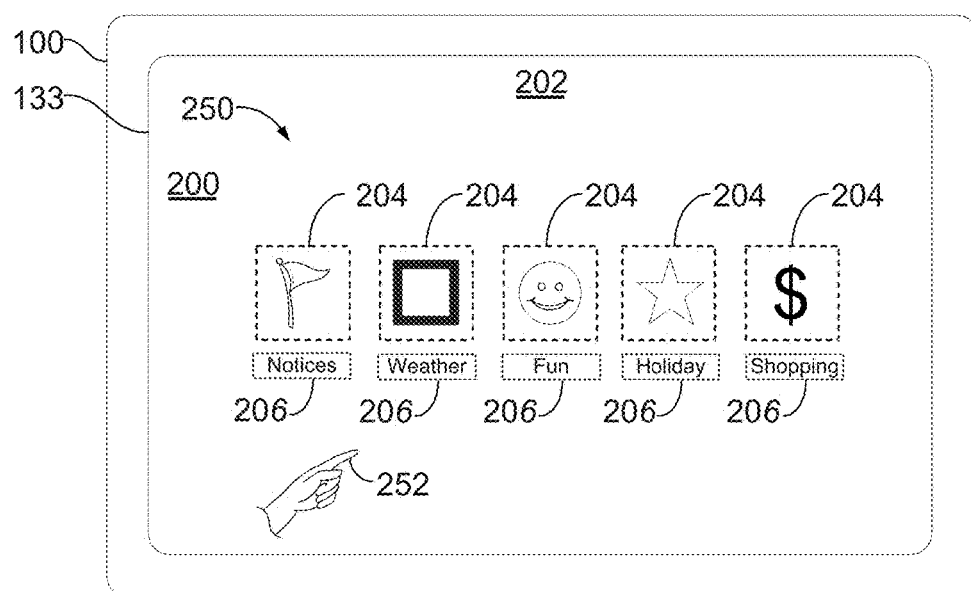

FIG. 2 and FIG. 3 illustrate exemplary GUIs 200 that may be displayed upon e.g. display 132, touch screen 133, etc., according to various embodiments of the present invention. GUI 200 may be generated by CPU 106 working in conjunction with applications 124 and GPU 172. GUI 200 provides an interface 202 that is displayed upon, for example, display 132, touch screen display 133, etc. The user may interact with interface 202 to manage computer system 100, to manage one or more devices in computer system 100, to manage, control, develop, create, etc. one or more applications 124, manage one or more devices connected to computer system 100, etc., it being understood that interface 202 may be utilized to accomplish many other tasks or be otherwise utilized.

Interface 202 may visually present actions available to the user enabling user to interact with computer system 100. The user may interact via interface 202 in a variety of ways, but generally the user interacts with interface 202 by manipulating visual objects 204, textual objects 206, etc. How a user manipulates a image object 204 depends upon, for example, the particular image object 204, hierarchies, associations, or relationships that exist between multiple visual objects 204, rules as defined by an application 124 associated with visual objects 204, etc.

As shown in FIG. 2, interface 202 may be a WIMP interface 210 (window, icon, menu, pointing device). When using a WIMP interface 210, the user utilizes, for example, the mouse or other handheld device 136 to control the position of cursor 218. In certain embodiments, the WIMP interface 210 presents information in a window 212 and an icon 220 based environment. The user may manipulate a particular image object 204 or text object 206 by maneuvering cursor 218 to the particular object (e.g. "flyover", etc.) and/or by engaging the mouse or other handheld device 136 (e.g. click, double click, etc.), etc. More generally, the user may manipulate a particular image object 204 or text object 206 by otherwise utilizing WIMP interface 210 to engage with the particular image object 204 or text object 206.

As shown in FIG. 3, interface 202 may be a gesture interface 250. Using gesture interface 250, the user may interact with computer system 100 by making gestures with one or more fingers 252 in contact with touch screen display 133. Exemplary gestures are pointing, pinching, flicking, rotating, etc. More generally, the user may manipulate a particular image object 204 or text object 206 by otherwise utilizing gesture interface 250 to engage with the particular image object 204. Gesture interface 250 is beneficial when computer system 100 is a smaller mobile device such as a tablet, PDA, or smart phone, due to screen size constraints.

Applications 124 may include an interface 202 having one or more image objects 204 and one or more text objects 206. Interfaces 202 may include numerous views or pages that may include similar image objects 204 or text objects 206 relative to other pages. As such, typically there are numerous different image objects 204 and text objects 204 utilized by a particular application 124 utilizing an interface 202. Further, use of an application 124 may occur in various geographies. Thus, there is a need for text objects 204 to be translated into local languages. It is therefore an object of one or more embodiments of the present invention to provide for context enriched application 124 text object 206 translation such that one or more translators may visualize various application 124 pages during a translation session. By visualizing the various application 124 interface 202 pages, the translator gains knowledge of text object 206 locations within a page, gains knowledge of possible relationships between different text objects 206 within the page, gains knowledge of the context, idiosyncrasies, overall message, intent of the page, etc. in order to increase the accuracy and to contextually improve text object 206 translations.

Figure 4:
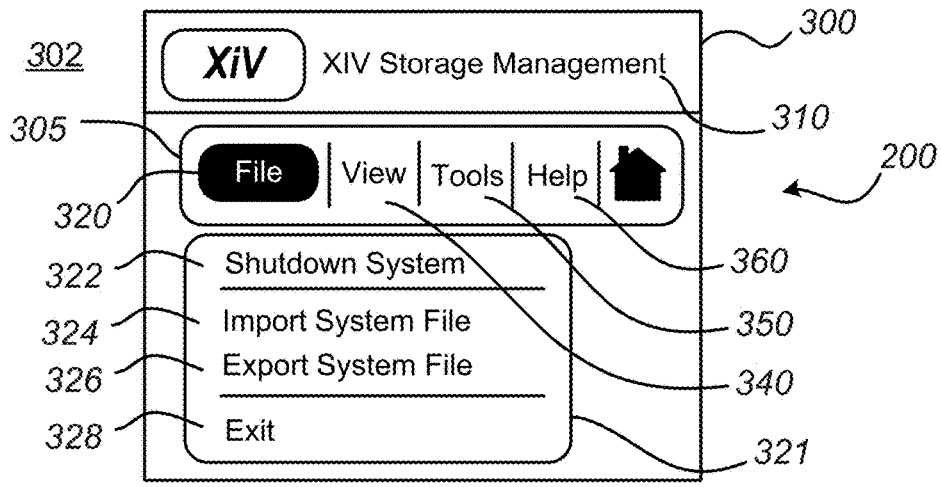
FIG. 4-FIG. 8 illustrate exemplary GUIs, according to embodiments of the present invention.

FIG. 4 illustrates an exemplary GUI 200 of an application 300, according to embodiments of the present invention. GUI 200 may include interface 302 comprising an application name text object 310 and menu text objects 320, 340, 350, 360, etc. related by their association with a menu bar 305. Application 300 may be utilized to manage a computing device 100, etc. such as a storage management server.

Interface 302 allows a user to interact with application 300. For example, the user may engage text object 320 whereby option menu 321 is subsequently displayed. Option menu 321 may comprise text objects 322, 324, 326, 328, etc. The sequential order of display option menu 321 after the engagement of text object 320, option menu 321 and the text objects 322, 324, 326, 328 within, are related or associated with text object 320. When an end user interacts with interface 302 of application 300, by for example engaging one or more text objects, operations or functions that correspond with those text objects are carried out. For example, if the user engages text object 326, a system file of the computing device 100, storage management server, etc. is exported. Further, if the user engages text object 322, the computing device 100, storage management server, etc. is shutdown.

Figure 5:
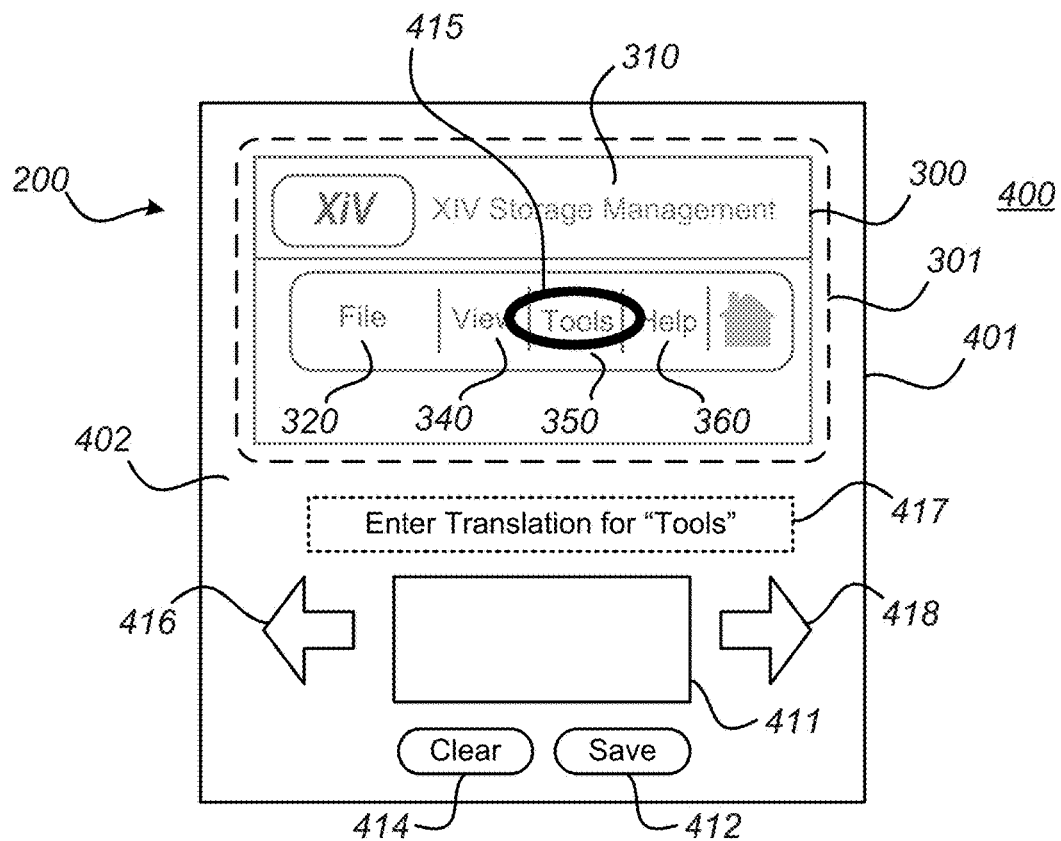

FIG. 5 illustrates an exemplary GUI 200 for a multilayer context enriched text translation application 400, according to embodiments of the present invention. In various embodiments of the present invention, application 400 includes interface 401 that comprises a simulation layer 301 that visually simulates interface 302 and a translation layer 402 that allows a translator to interact or engage therewith and create context enriched application text translations. The multi layer interface 401 enables a translator to visualize one or more text objects 206 within simulation of interface 302 and translate those text objects 206 utilizing translation layer 402.

For example, during the translation session the translator may view simulation layer 301 to visualize text object 320, 340, 350, etc. locations within a particular application 400 page, to generally learn of potential relationships between text objects 320 and e.g. text object 322, 324, etc. within an application 400 page, or generally learn of context, idiosyncrasies, overall message, intent of text objects 206 within particular application 400 pages. Subsequently, the translator may utilize translation layer 402 to enter a text translation of one or more text objects 206. Thus, the multilayer context enriched text translation application 400 may increase the accuracy and contextually improve text object 206 translations.

Simulation layer 301 presents a visually accurate reproduction of one or more pages, portion(s) of one or more pages, etc. of a user interface of an application 124. In other words, simulation layer 301 mimics one or more interface views of an application 124. In certain embodiments, simulation layer 301 includes a mimicked full page view of application 124. For example, simulation layer 301 may include a reproduction of the entire interface 302 shown in FIG. 4. In other embodiments, simulation layer 301 includes a mimicked partial page view of an application 124. For example, simulation layer 301 may include a reproduction of a partial view of interface 302 as is shown in FIG. 5.

In certain embodiments, simulation layer 301 may include an invoked interface of an application 124 with user engagement functionality associated with the underlying application 124 disabled. For clarity, a translator may still interact within simulation layer 301; however, such interaction is associated with translation layer 402. For example, if the translator engages text object 360, the translator is not displayed help options as would be displayed when interacting with interface 302; but rather, the translator may be prompted to enter a text translation for text object 360 associated with translation layer 402.

Translation layer 402 generally includes an interface to receive a translation of a text object 206 within simulation layer 301. In various embodiments, translation layer 402 includes a text-editing object 411 for receiving a text translation of the text object 206 within simulation layer 301 from a translator. In certain embodiments, translation layer 402 includes a prompt object 417 to prompt the translator to enter a translation of a particular text object 206. In various embodiments, translation layer 402 may also include navigation objects 416, 418, management objects (e.g. clear object 414, save object 412, etc.), and/or accentuation object 415, etc.

In a particular embodiment, to begin a translation session, the translator may engage a particular text object 206 within simulation layer 301. For example, the translator may engage text object 350. Subsequently, accentuation object 415 highlights the selected text object 350, prompt object 417 dynamically prompts for the translation of text object 350, etc. The translator may reference simulation layer 301 to visualize text object 350 location, to learn of potential relationships between text objects 350 and other text objects, and or generally learn of context, idiosyncrasies, overall message, scope of text objects 350 to make an accurate and contextually improved text object 350 translation. The translator may input the translation via the text-editing object 411 (e.g. the user selects the text-editing object 411 and utilizes a keyboard to enter the translation, etc.). The translator may confirm or save the entered translation by engaging save object 412 or clear the entered translation by engaging clear object 414. In certain embodiments, upon the translator confirming or saving the entered text translation, the translated text may be shown in the location of the text object 206 (e.g. the translated text may be swapped with the text object, etc.).

In certain embodiments, navigation object 418 may be engaged by the translator to advance to a next text object 206, to a next view or page, etc. For example, the translator may select navigation object 418 and accentuation object 415 highlights the next text object 206, prompt object 417 dynamically prompts for the translation of the next text object 206, etc. In other embodiment, navigation object 418 may be selected to advance to a next mimicked page or advance to a next portion of the mimicked page within simulation layer 301.

In certain embodiments, navigation object 416 may be engaged by the translator to retract to a previous text object 206, to a previous view or page, etc. For example, the translator may select navigation object 416 and accentuation object 415 highlights the previous text object 206, prompt object 417 dynamically prompts for the translation of the previous text object 206, the translation of the previous text object 206 is shown in text-editing object 411, etc. In other embodiment, navigation object 416 may be selected to revert to a previous mimicked page or revert to a previous portion of the mimicked page within simulation layer 301.

In various embodiments, multilayer context enriched text translation application 400 generates mimicked or reproduced views of pages or partial pages by accessing one or more property files associated with an application 124 and displays the mimicked views within simulation layer 301 via CPU 106 working in conjunction with GPU 172 and the application 124. In certain embodiments, multilayer context enriched text translation application 400 displays within simulation layer 301 each page of the application 124 in a sequential or view-by-view mode for the display of every text object 206 included therein. Thus, all text objects 206 within a particular application 124 may effectively be translated. In various embodiments, the translation may be saved in associated or appropriate property files associated with the application 124. For example, if the application 124 is translated into French, each translation of text object 206 of the application 124 is saved into a French resource file associated with the application 124.

In various embodiments, multilayer context enriched text translation application 400 includes an simulation engine to run the GUI of an application 124 in a mode such that all available views or pages including all available text objects 206 are displayed within simulation layer 301 and back-end function logic of application 124 is disabled—such that when a user engages a text object 206 within the simulation layer 301 the back-end function associated with that text object 206 is not invoked; but rather, the user is engaged or otherwise allowed to enter a text translation to that text object 206. Additionally, the simulation engine may obtain parameters from one or more property files of application 124 in order to simulate and display available views or pages within simulation layer 301.

In various embodiments, multilayer context enriched text translation application 400 includes a property file engine to create a new resource file associated with a translation session and add each translated text to an equivalent, associated, etc. location within the new resource file as compared with the original resource file. For example, if the translator is translating to French, the property file engine creates a French resource file and saves each text object 206 translation to an equivalent location in the French resource file relative to the original resource file.

Figure 6:
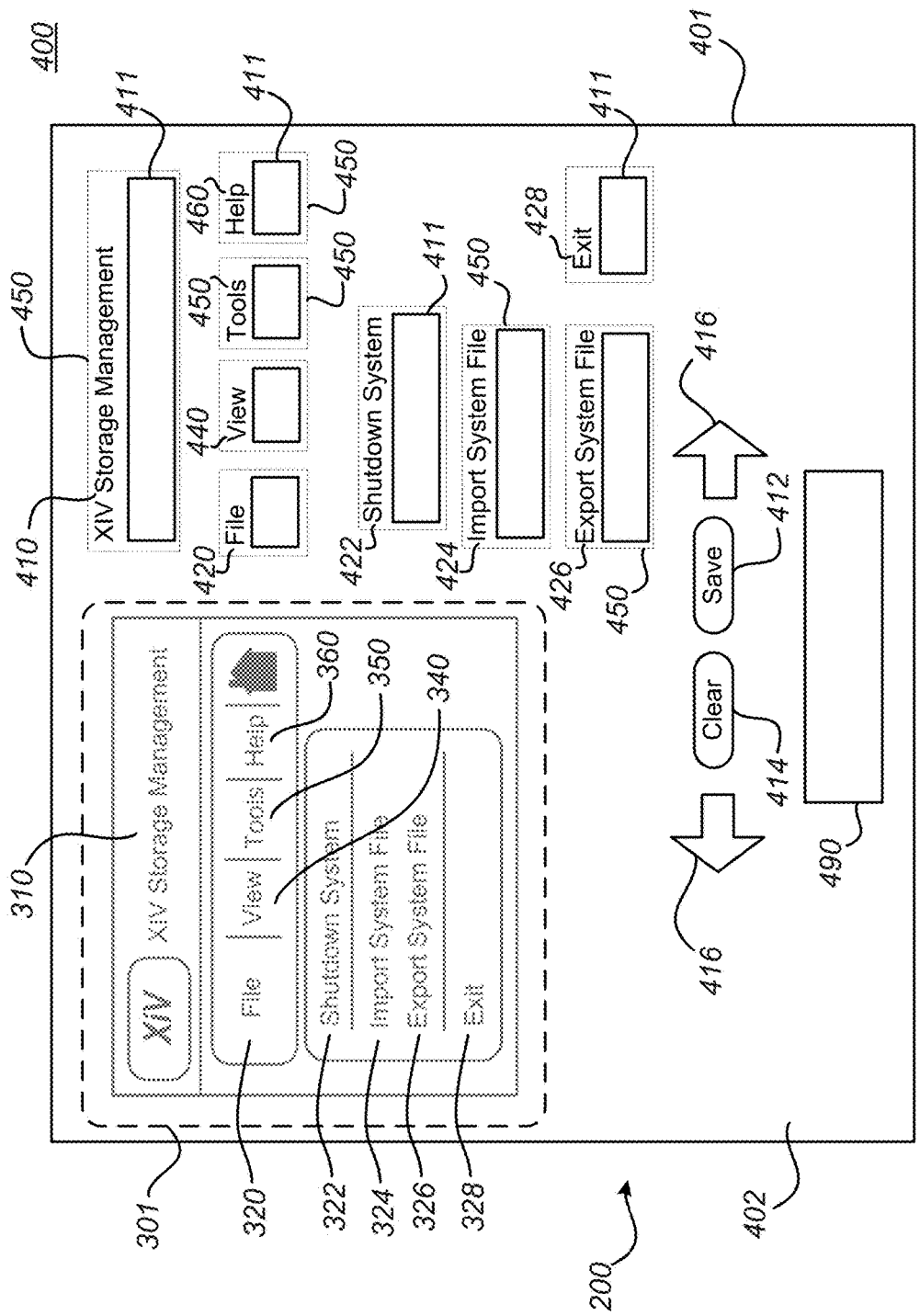

FIG. 6 illustrates another exemplary GUI 200 for multilayer context enriched text translation application 400. In various embodiments, such as shown in FIG. 6, translation layer 402 includes one or more translation objects 450. Each translation object 450 may include a text-editing object 411 and a translation prompt object. In certain implementations, particular translation objects 450 are displayed for each particular text object 206 of interface 302, each particular text object shown in simulation layer 301, etc. In certain embodiments, the prompt object is associated with a particular text object 206 of interface 302, a particular text object shown in simulation layer 301, etc. Generally, prompt object prompts the translator to make a text translation of an associated text object 206.

For example, translation layer 401 may include a translation object 450 including a text-editing object 411 and a translation prompt object 410 associated with text object 310 whereby a translator may input a text translation for text object 310 via text-editing object 411. Various other translation objects 450 may include prompt objects 420, 440, 450, 460 that are associated with text object 320, 340, 350, and 360 respectively.

In certain embodiments, a related group of translation objects 450 may be included within translation layer 402. For example, translation objects 450 that include prompt objects 420, 440, 450, 460 may be displayed within translation layer 402 prior to e.g. translation objects 450 that include prompt objects 422, 424, 426, 428, etc. In other example, translation objects 450 that include prompt objects 420, 422, 424, 426, and 428 may be displayed within translation layer 402 prior to e.g. translation objects 450 that include prompt objects 440, 450, 460, etc. Yet in other embodiments, all translations objects 450 are displayed for each particular text object 206 of interface 302, each particular text object shown in simulation layer 301, etc. For example, text translation objects 450 that include prompt objects 410, 420, 422, 424, 426, 428, 440, 450, and 460 are displayed within translation layer 402 simultaneously.

In certain embodiments, translation layer 402 may include a comment object 490 to allow for the translator to input a comment or notation. The comment may be linked or associated with current contents of a text-editing object 411. For example, the translator may input a text translation for text object 322 in translation object 450 that include prompt object 422 and enter a comment with comment object 490. When the translator engages save object 412, e.g. the contents of text-editing object 411 and contents of comment object 490 are associated and saved. In certain implementations, a report may be generated subsequent to the translation session to view one or more comments entered via comment object 490.

Figure 7:
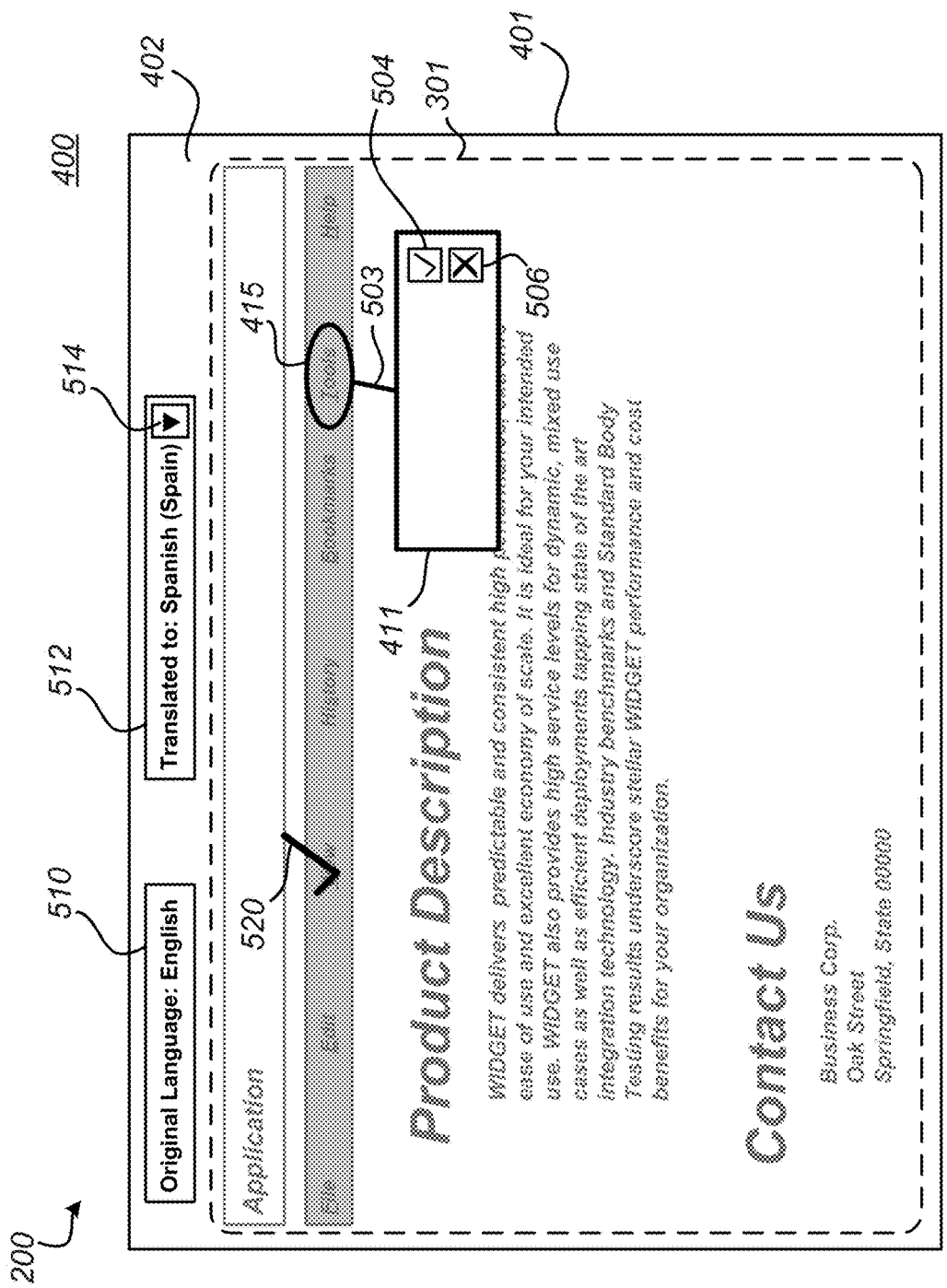

FIG. 7 illustrates another exemplary GUI 200 for multilayer context enriched text translation application 400. In various embodiments, such as shown in FIG. 7, simulation layer 301 is generally displayed atop of or otherwise overlapping translation layer 402. In such embodiments, however, portions of translation layer 402 (e.g. text-editing object 411, etc.) may appear to be displayed atop of or otherwise overlapping simulation layer 301. For example, subsequently to the translator engaging a "Tools" text object 206 within simulation layer 301, text-editing object 411, accentuation object 415, and link object 503 may be displayed upon interface 401 generally upon, within the area of, etc. simulation layer 301. Such stacked layer, partial layer stacking, etc. display orientations may be beneficial when application 400 is displayed upon a computer system 100 with limited display 132, touch screen 133, areas.

In certain implementations, translation layer 402 may include accentuation object 415, link object 503, accept object 504, reject object 506, completion notification object 520, etc. Accentuation object 415 may highlight, emphasize, or otherwise accentuate an engaged text object 206 to be translated. Link object 503 may visually connect a particular accentuation object 415 and text-editing object 411. Accept object 504 and reject object 506 may be associated with text-editing object 411. Accept object 504 may be engaged to save a translation entered within text-editing object 411. Reject object 506 may be engaged to erase or cancel a translation entered within text-editing object 411. Once the translator engages accept object 504, a completion notification object 520 may be displayed upon or associated with the translated text object 206. For example, a translation has been accepted for the "View" text object and a completion notification object 520 is associatively displayed. Generally, completion notification object 520 may notify that a translation of an associated text object 206 has been completed.

In certain embodiments, translation layer 402 may include original language notification object 510, translated to language object 512, pull down navigation object 514, etc. Original language notification object 510 may notify the language that application 400 was originally developed. Original language notification object 510 may be selected within interface 401 to display the original language or original language notification object 510 may be displayed upon interface subsequently to translation layer 402 determining the original language. Translated to language object 512 indicates the language that text objects 206 will be translated to. Translated to language object 512 may be set by the translator at the start of a translation session by engaging e.g. pull down navigation object 514. The setting of translated to language object 512 may be utilized to create a language resource within the property files of application 400. In certain embodiments, when the translation session is completed, application 400 may notify that an associated language resource has been created, may notify that an associated language resource is ready for further packaging, etc. For example, the application 400 developer may be notified that a Spanish language resource file has been created or that the Spanish language resource is ready for further property file packaging.

In embodiments, such as shown in FIG. 7, a single text object 206 may be translated via text-editing object 411 within an interface 401 view. When a translation is accepted e.g. via accept object 504, text-editing object 411, accentuation object 415, link object 503, etc. may disappear from interface 401. This allows the translator to engage a subsequent text object 206 wherein text-editing object 411, accentuation object 415, link object 503, etc. may be displayed in association with the engaged subsequent text object 206. In other embodiments, text-editing object 411, accentuation object 415, link object 503 may be automatically displayed in association with a next text object 206.

Figure 8:
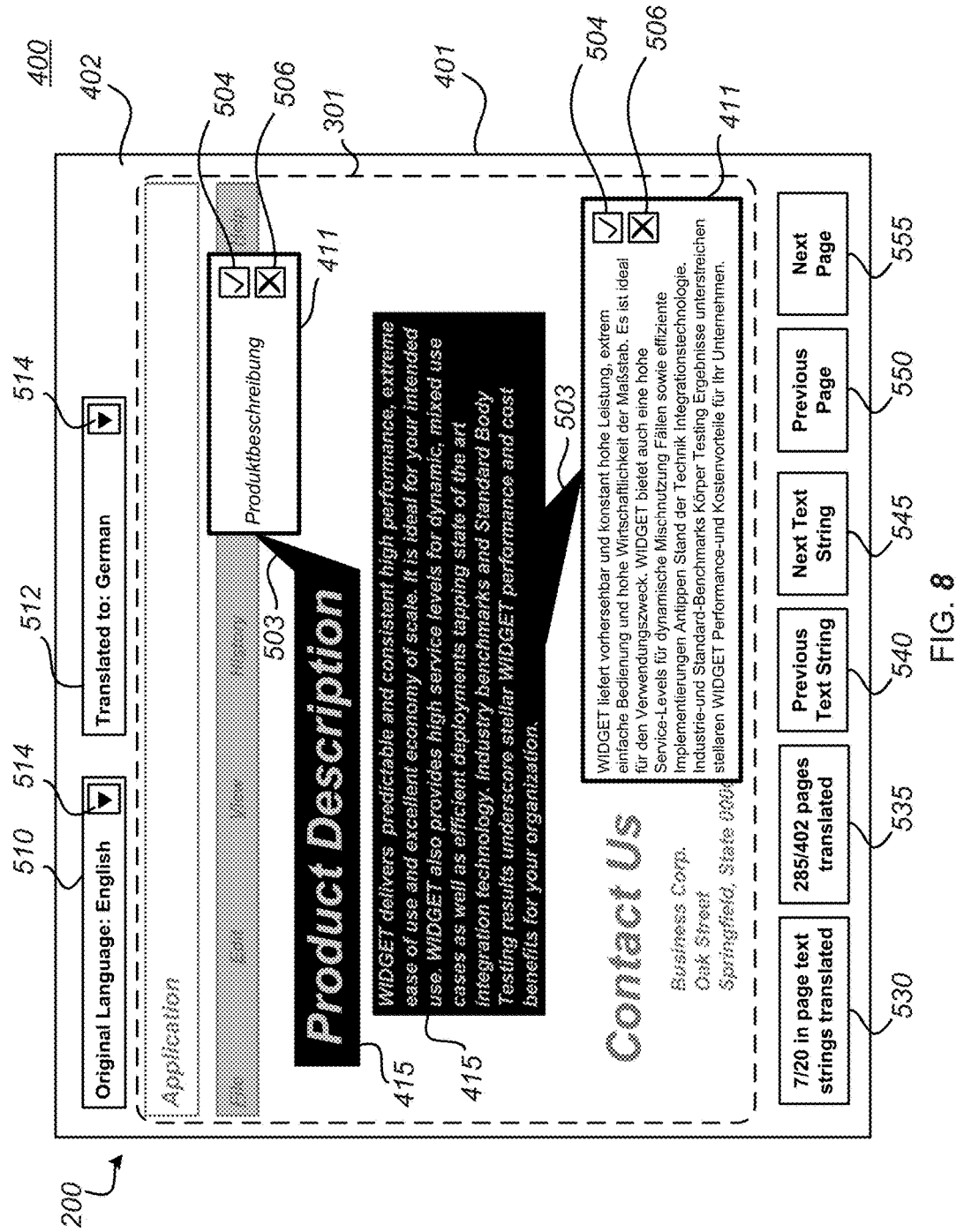

FIG. 8 illustrates another exemplary GUI 200 for multilayer context enriched text translation application 400 wherein multiple text objects 206 may be translated via respective text-editing objects 411 within an interface 401 view. In certain implementations, application 400 may include or otherwise utilize a machine translation engine to generate draft translations within translation layer 402. For example, the translator may engage the "Product Description" text object 206 and an associated text-editing object 411 may be displayed having a draft translation contained therein. The draft translation may be generated within the selected language chosen or set within translated to language object 512. The translator may accept the draft translation by engaging accept object 504 or may clear the draft translation by engaging reject object 506. The translator may also engage text-editing object 411 and make changes to the draft translation therein.

In various embodiments, the multilayer context enriched text translation application 400 property file engine to create a new resource file associated with the selected language set within translated to language object 512 and adds each translated text to an equivalent, associated, etc. location within the new resource file as compared with the original resource file. For example, if the translator is translating from English to German the translator selects German within translated to language object 512 and a German resource is created within the property file of application 400. Upon the translator accepting a German translation via the accept object 406, that translation is saved to an equivalent location in the German resource file relative to the original English resource file.

In certain embodiments, multilayer context enriched text translation application 400 includes status objects 530, 535 and/or navigation objects 540, 545, 550, 555. Status object 530 may display the number of text objects 206 that have been translated out of the total number of text objects to be translated associated with an application 400 page, view, etc. Status object 535 may display the number of pages, views, etc. that have been translated out of the total number of pages, views, etc. within application 400. Navigation object 540 may be engaged to display a previous text object 206 within a text-editing object 411. Navigation object 545 may be engaged to display a next text object 206 within a text-editing object 411. Navigation object 550 may be engaged to display a previous page, view, etc. of application 400 within simulation layer 301. Navigation object 555 may be engaged to display a next page, view, etc. of application 400 within simulation layer 301.

In certain embodiments, as shown in FIG. 5, translation layer 402 and simulation layer 301 may be displayed within interface 401 with approximately equal display areas. In certain embodiments, as shown in FIG. 6, translation layer 402 may have a larger display area within interface 401 relative to simulation layer 301. In certain other embodiments, as shown in FIG. 7, simulation layer 301 may have a larger display area within interface 401 relative to translation layer 402. Further, in some embodiments, translation layer 402 and simulation layer 301 do not generally overlap when displayed within interface 401. However, in other embodiments, translation layer 402 and simulation layer 301 do overlap when displayed within interface 401 (e.g. portions of translation layer 402 may overlap simulation layer 301, etc.).

Figure 9:
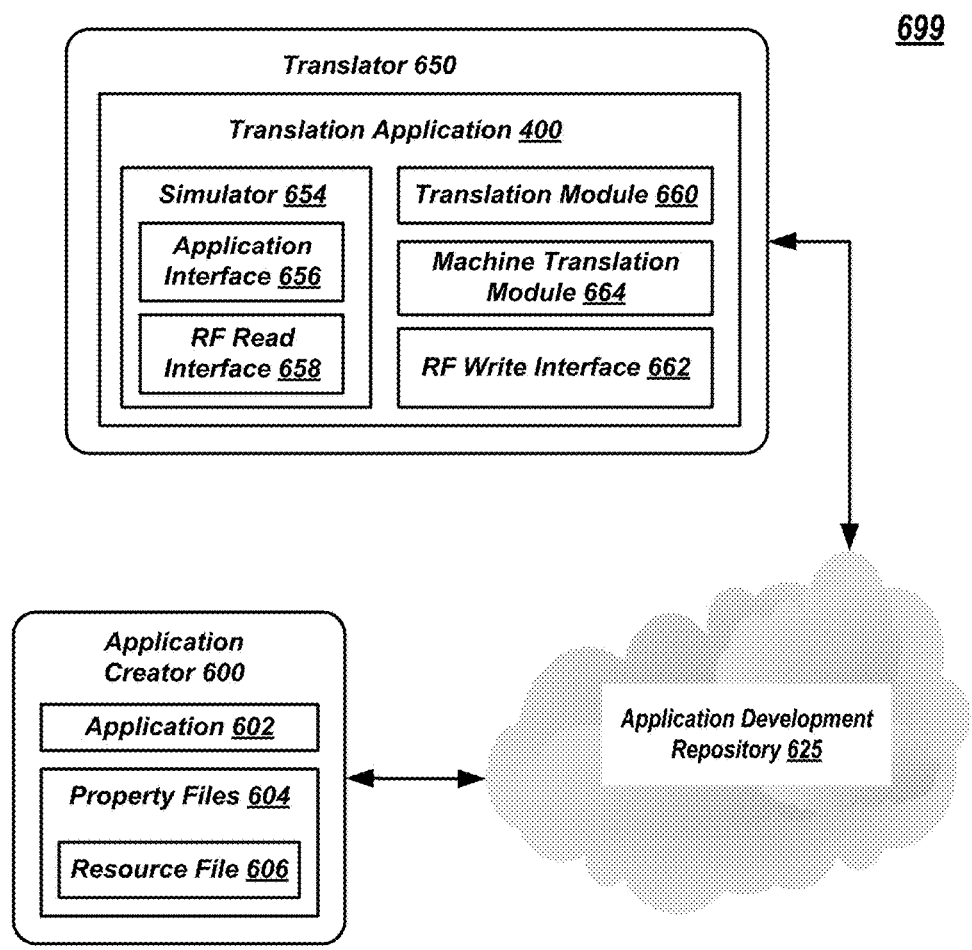
FIG. 9 illustrates a context enriched application text translation system, according to various embodiments of the present invention.

FIG. 9 illustrates context enriched application text translation system 699. In various embodiments, system 699 includes an application creator 600 communicatively connected to a translator 650 via an application development repository 625. Application creator 600 may be, for example, a computer system 100. Likewise, translator 650 may be, for example, a computer system 100. Repository 625 may be for example, a team room, development environment, storage cloud, storage area network, etc. that includes one or more computer readable storage mediums for storage of one or more components further discussed herein.

Application creator 600 includes an application 602 (e.g. application 124, application 300, etc.) having a GUI 200 comprising at least one text object 206 to be translated. Application creator 600 also includes application property file(s) 604 and associated language resource file(s) 606. For example, an English language resource file 606 is included within property files 604 during the development of application 602 in the English language.

Translator 650 includes multilayer context enriched text translation application 400. In various embodiments, application 400 may include a simulation engine 654, application interface 656, resource file read interface 658, translation module 660, machine translation module 664, resource file write interface 662, etc. In certain embodiments, simulator 654, translation module 660, etc. may be a hardware component such as a FPGA, IC, circuits within GPU 172, etc. within translator 650. In other embodiments, simulator 654, translation module 660, etc. may be a routine or subroutine of application 400 that may be stored e.g. within memory 120 of translator 650.

Application 400, via the processor complex 104, may generate and display interface 401. Simulation engine 653 may generate and display the simulation layer 301 to visually simulate a GUI, interface, etc. of application 602. Translation module 660 may generate and display translation layer 402 to allow a user to interact or engage with translator 650 and create context enriched application text translations.

In certain embodiments, application interface 656 may invoke application 602 and disable user engagement functionality associated with application 602. The application 602 may be invoked by calling the original language resource file via the resource file read interface 658 in order for simulator 654 to visually simulate the GUI, interface, etc. of application 602.

In various embodiments, simulator 654 generates mimicked or reproduced views of pages or partial pages by accessing one or more property files, via resource file read interface 658, associated with application 602 and displays the mimicked views within simulation layer 301 via processor complex 104. In various embodiments, application interface 656 invokes the GUI 200 of application 602 in a mode such that all available views or pages including all available text objects 206 are displayed within simulation layer 301. Simulator 654 disables back-end function logic of application 602—such that when a user engages a text object 206 within the simulation layer 301 the back-end function associated with that text object 206 is not invoked; but rather, the user is engaged or otherwise allowed to interact with the text object 206 in association with translation layer 402.

Translation module 660 may generate, display, etc. an interface and receives a translation of text object 206. In various embodiments, translation module 660 may generate and display text-editing object 411, prompt object 417, navigation objects 416, 418, clear object 414, save object 412, accentuation object 415, translation objects 450, comment object 490, link object 503, accept object 504, reject object 506, original language notification object 510, translated to language object 512, pull down navigation object 514, completion notification object 520, status objects 530, 535 navigation objects 540, 545, 550, 555, translation prompt object, etc.

In various embodiments, a translation of text object 206 may be saved in an appropriate property file by resource file write interface 662. For example, if application 602 is translated into French, each translation of text object 206 is saved into a French resource file by resource file write interface 662. Resource file write interface 662 may interact with resource file read interface 658 to determine a proper location with in the new resource file to write the translation. For example, resource file write interface 662 may write the translation to an equivalent location within the new resource file relative to the location of the text object in the original resource file. In certain embodiments, the new resource file may be saved to the repository 625 whereby application creator 600 may obtain the new resource file for further integration or packaging into property files 604. For example, application 400 may notify application creator 600 that a new language resource has been created, is ready for further packaging, etc. Write resource file interface 662 may determine the language of the translation session via e.g. translated to language object 512 and the setting of translated to language object 512 may be utilized by resource file interface 662 to create a language resource file that may be stored in repository 625.

In certain implementations, application 400 may include or otherwise utilize a machine translation engine 664 to generate draft translations within translation layer 402. The draft translation may be generated by translation engine 664 within the selected language chosen or set within translated to language object 512. In addition to the machine translation module, translation engine 664 may also include a pronunciation module, dictionary module, thesaurus module, etc. to assist a user of translator 650 in making proper text object 206 translations.

Figure 10:
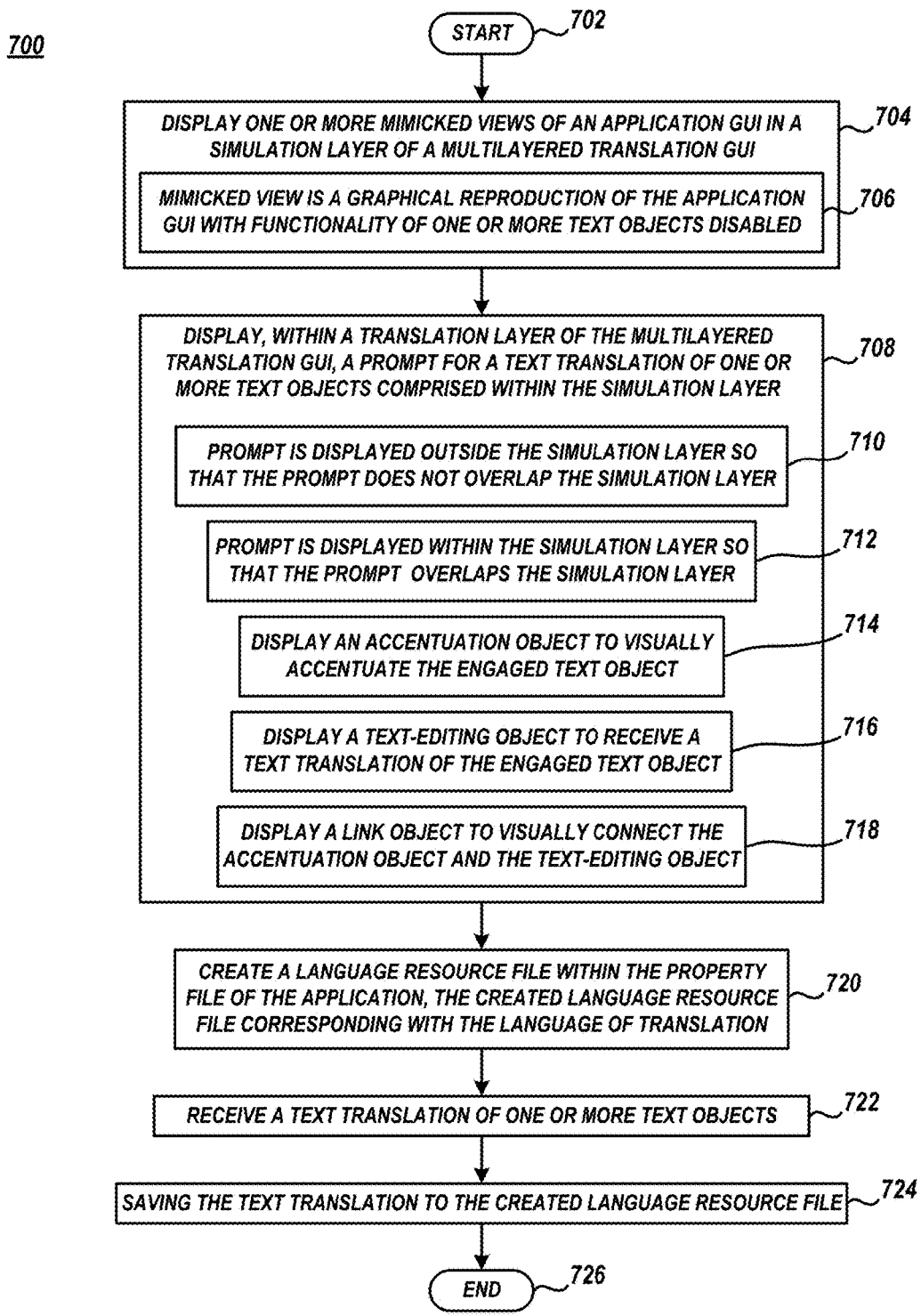
FIG. 10 illustrates an exemplary method for multilayered context enriched text translation, according to various embodiments of the present invention.

FIG. 10 illustrates an exemplary method 700 for multilayered context enriched text translation, according to various embodiments of the present invention. Method 700 begins at block 702 and continues with displaying, via processing complex 104, one or more mimicked views of an application GUI in simulation layer 301 of multilayered translation interface 400 (block 704). In certain embodiments, a mimicked view is a graphical reproduction of the application GUI with functionality of one or more text objects 206 disabled.

Subsequent to a user engaging a text object 206 within simulation layer 301, displaying a prompt for a text translation of one or more text objects 206 within a translation layer 402 of the multilayered translation interface 400 (block 708). In certain embodiments, the prompt for the text translation of the text object 206 is displayed outside of the simulation layer 301 such that the prompt does not overlap the simulation layer 301 (block 710). In certain embodiments, the prompt for the text translation of the text object 206 within the translation layer 301 is displayed within the simulation layer 301 such that the prompt overlaps the simulation layer 301 (block 712).

In certain embodiments, displaying the prompt for the text translation of the text object 206 within the translation layer 402 of the multilayered translation interface 400 further includes displaying a accentuation object 415 within the translation layer 402 to visually accentuate the engaged text object 206 within the simulation layer 301 (block 714), displaying a text-editing object 411 within the translation layer 402 to receive a text translation for the engaged text object 206 within the simulation layer 301 (block 716), and/or displaying a link object 503 within the translation layer 402 to visually connect the accentuation object 415 and the text-editing object 411 (block 718). In certain embodiments, a particular prompt is displayed for the text translation of a single text object 206 within the translation layer 402 of the multilayered translation interface 400. In other embodiments, a plurality of prompts are displayed for the text translation of a plurality of text objects 206 within the translation layer 402 of the multilayered translation interface 400, wherein each particular prompt associated with a particular text object.

Method 700 continues with creating, via processing complex 104, a language resource file within property files of the application 602, the created language resource file corresponding with the language of translation (block 720), receiving a text translation of one or more text objects 206 to the language of translation (block 722), and saving the text translation of one or more text objects 206 to the created language resource file (block 724).

In certain embodiments, method 700 may also include displaying one or more translations within the one or more mimicked views of the application GUI in the simulation layer 301 in place of one or more text objects 206. Method 700 ends at block 726.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A computer system comprising:
   a touch screen;
   a processor communicatively connected to a memory; the memory comprising program instructions that when executed by the processor, cause the computer system to:
   display a mimicked view of an application graphical user interface (GUI) upon the touch screen in a simulation layer of a multilayered translation interface, wherein the mimicked view is a graphical reproduction of the application GUI with functionality of the one or more text objects of the application GUI disabled, and wherein the simulation layer comprises one or more text objects;
   subsequent to a user touch engaging a text object within the simulation layer, display a prompt for a user to enter a text translation of the touch engaged text object within a translation layer of the multilayered translation interface, wherein the prompt further comprises an accentuation object within the translation layer to visually accentuate the engaged text object; a text-editing object within the translation layer to receive the text translation of the engaged text objet from the user via the touch screen, and a link object within the translation layer that visually connects the accentuation object and the text-editing object;
   receive the text translation of the touch engaged text object; and
   display the text translation within the mimicked view in the simulation layer in place of the engaged text object.

2. The computer system of claim 1, wherein the prompt is displayed outside of the simulation layer such that the prompt does not overlap the simulation layer.

3. The computer system of claim 1, wherein the prompt is displayed within the simulation layer such that the prompt overlaps the simulation layer.

4. The computer system of claim 1, further comprising:
   a language resource file of the application stored within the memory, the language resource file corresponding with the language of translation and comprising the received text translation of the touch engaged text object.

5. A computer system comprising:
   a display screen;
   a processor communicatively connected to a memory; the memory comprising program instructions that when executed by the processor, cause the computer system to:
   display a mimicked view of an application graphical user interface (GUI) upon the display screen in a simulation layer of a multilayered translation interface, wherein the mimicked view is a graphical reproduction of the application GUI with functionality of the one or more text objects of the application GUI disabled, and wherein the simulation layer comprises one or more text objects;
   subsequent to a user engaging a text object within the simulation layer, display a prompt for a user to enter a text translation of the touch engaged text object within a translation layer of the multilayered translation interface, wherein the prompt further comprises an accentuation object within the translation layer to visually accentuate the engaged text object; a text-editing object within the translation layer to receive the text translation of the engaged text objet from the user via a keyboard, and a link object within the translation layer that visually connects the accentuation object and the text-editing object;
   receive the text translation of the engaged text object; and
   display the text translation within the mimicked view in the simulation layer in place of the engaged text object.

6. The computer system of claim 5, wherein the prompt is displayed outside of the simulation layer such that the prompt does not overlap the simulation layer.

7. The computer system of claim 5, wherein the prompt is displayed within the simulation layer such that the prompt overlaps the simulation layer.

8. The computer system of claim 5, further comprising:
   a language resource file of the application stored within the memory, the language resource file corresponding with the language of translation and comprising the received text translation of the touch engaged text object.

9. A computer system comprising:
   a screen;
   a processor communicatively connected to a memory; the memory comprising program instructions that when executed by the processor, cause the computer system to display an application graphical user interface (GUI) upon the screen, the application GUI comprising:
   a simulation layer that displays one or more mimicked views of the application GUI, wherein the mimicked views are graphical reproductions of the application GUI pages with functionality of one or more text objects of the application GUI disabled;
   a translation layer that displays a prompt for a text translation of the one or more text objects displayed within the simulation layer, subsequent to a user engaging the one or more text objects, wherein the prompt comprises:
one or more accentuation objects to visually accentuate the engaged one or more text objects;
one or more text-editing objects to receive the text translation of the engaged one or more text objects via a keyboard of the computer system, and;
one or more link objects to visually connect one or more accentuation objects with respective one or more text-editing objects;
wherein upon the receipt of the text translation of the engaged one or more text objects, the application GUI further comprises the text translation within the mimicked view in the simulation layer in place of the engaged one or more text objects.

10. The computer system of claim 9, wherein the prompt is displayed outside of the simulation layer such that the prompt does not overlap the simulation layer.

11. The computer system of claim 9, wherein the prompt is displayed within the simulation layer such that the prompt overlaps the simulation layer.

\* \* \* \* \*